(12) United States Patent
Achanta

(10) Patent No.: US 9,759,816 B2
(45) Date of Patent: Sep. 12, 2017

(54) MULTI-CONSTELLATION GNSS INTEGRITY CHECK FOR DETECTION OF TIME SIGNAL MANIPULATION

(71) Applicant: Schweitzer Engineering Laboratories, Inc., Pullman, WA (US)

(72) Inventor: Shankar V. Achanta, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 1276 days.

(21) Appl. No.: 13/887,617

(22) Filed: May 6, 2013

(65) Prior Publication Data

US 2016/0154109 A1    Jun. 2, 2016

Related U.S. Application Data

(60) Provisional application No. 61/751,746, filed on Jan. 11, 2013.

(51) Int. Cl.
   *G01S 19/20* (2010.01)
   *G01S 19/21* (2010.01)

(52) U.S. Cl.
   CPC .................... *G01S 19/215* (2013.01)

(58) Field of Classification Search
   CPC ........... G01S 19/20; G01S 19/21; G01S 19/14
   USPC .......................... 342/357.58, 357.52, 357.59
   See application file for complete search history.

(56) References Cited

U.S. PATENT DOCUMENTS

| 5,160,926 | A  | 11/1992 | Schweitzer, III |
| 5,557,284 | A  | 9/1996  | Hartman         |
| 5,737,715 | A  | 4/1998  | Deaton          |
| 6,144,334 | A  | 11/2000 | Claffey         |
| 6,229,479 | B1 | 5/2001  | Kozlov          |
| 6,483,856 | B1 | 11/2002 | Bird            |
| 7,146,516 | B2 | 12/2006 | Dhupar          |
| 7,375,683 | B2 | 5/2008  | Smith           |
| 7,398,411 | B2 | 7/2008  | Zweigle         |

(Continued)

FOREIGN PATENT DOCUMENTS

| WO | 9747987    | 12/1997 |
| WO | 2012151006 | 11/2012 |
| WO | 2014005016 | 1/2014  |

OTHER PUBLICATIONS

PCT/US2013/064942 Patent Cooperation Treaty, International Search Report and Written Opinion of the International Searching Authority, Jan. 29, 2014.

(Continued)

*Primary Examiner* — Harry Liu
(74) *Attorney, Agent, or Firm* — Richard M. Edge

(57) ABSTRACT

The present application discloses detecting manipulation of GNSS signals using a second time source. If two or more GNSS constellation signals are being detected, the phase error between the GNSS constellation signals may be monitored. When the phase error drifts, then manipulation is determined. The integrity of a GNSS constellation signal may be monitored using an internal time source such as a crystal oscillator by monitoring a slope of the free running counter at the detected rising edges of a pulse-per-second signal from the GNSS constellation. If more than two GNSS constellations are monitored, a voting scheme may be used to determine the manipulated GNSS constellation.

11 Claims, 9 Drawing Sheets

(56) References Cited

U.S. PATENT DOCUMENTS

| | | |
|---|---|---|
| 7,436,232 B2 | 10/2008 | Sivero |
| 7,440,427 B1 | 10/2008 | Katz |
| 7,606,541 B1 | 10/2009 | Nicholls |
| 7,940,213 B2 | 5/2011 | Harper |
| 7,952,519 B1 | 5/2011 | Nielsen |
| 7,978,130 B1 | 7/2011 | Cohen |
| 7,979,228 B2 | 7/2011 | Zurbuchen |
| 8,055,288 B2 | 11/2011 | Ladd |
| 8,138,972 B2 | 3/2012 | Underbrink |
| 8,159,391 B2 | 4/2012 | Papadimitratos |
| 8,237,609 B2 | 8/2012 | Talbot |
| 8,325,087 B2 | 12/2012 | Thomson |
| 8,326,319 B2 | 12/2012 | Davis |
| 8,446,896 B2 | 5/2013 | Bedrosian |
| 8,564,330 B1 | 10/2013 | Radulov |
| 8,655,608 B2 | 2/2014 | Guzman-Casillas |
| 8,867,520 B2 | 10/2014 | Nicholls |
| 9,083,503 B2 | 7/2015 | Sagen |
| 9,270,442 B2 | 2/2016 | Rice |
| 9,319,100 B2 | 4/2016 | Achanta |
| 2002/0136172 A1* | 9/2002 | Chun .................. H04B 7/2693 370/328 |
| 2002/0158693 A1 | 10/2002 | Soong |
| 2002/0167934 A1 | 11/2002 | Carter |
| 2003/0087654 A1 | 5/2003 | Wheeler |
| 2003/0107513 A1 | 6/2003 | Abraham |
| 2004/0062279 A1 | 4/2004 | Primrose |
| 2004/0166879 A1 | 8/2004 | Meadows |
| 2004/0228368 A1 | 11/2004 | Jecmen |
| 2006/0259806 A1 | 11/2006 | Zweigle |
| 2007/0132773 A1 | 6/2007 | Plante |
| 2007/0194987 A1 | 8/2007 | Fedora |
| 2008/0062039 A1* | 3/2008 | Cohen ..................... G01S 19/05 342/357.29 |
| 2008/0169978 A1 | 7/2008 | Powell |
| 2008/0186229 A1 | 8/2008 | Van Diggelen |
| 2008/0198069 A1 | 8/2008 | Gronemeyer |
| 2009/0117928 A1 | 5/2009 | Ladd |
| 2009/0160705 A1 | 6/2009 | Matsuzaki |
| 2009/0315764 A1 | 12/2009 | Cohen |
| 2010/0030916 A1 | 2/2010 | Greenwood Graham |
| 2010/0034190 A1 | 2/2010 | Yun |
| 2010/0073228 A1 | 3/2010 | Smith |
| 2010/0117899 A1 | 5/2010 | Papadimitratos |
| 2010/0127928 A1* | 5/2010 | Thomson .............. G01S 19/215 342/357.45 |
| 2010/0190509 A1 | 7/2010 | Davis |
| 2010/0222068 A1 | 9/2010 | Gaal |
| 2010/0231445 A1* | 9/2010 | Tarlow ..................... G01S 19/13 342/357.28 |
| 2010/0231448 A1 | 9/2010 | Harper |
| 2010/0253578 A1 | 10/2010 | Mantovani |
| 2010/0254225 A1 | 10/2010 | Schweitzer, III |
| 2011/0001668 A1 | 1/2011 | Cobb |
| 2011/0035066 A1 | 2/2011 | Schweitzer |
| 2011/0068973 A1 | 3/2011 | Humphreys |
| 2011/0085540 A1 | 4/2011 | Kuwabara |
| 2011/0102258 A1 | 5/2011 | Underbrink |
| 2011/0102259 A1 | 5/2011 | Ledvina |
| 2011/0169577 A1 | 7/2011 | Nicholls |
| 2011/0181466 A1 | 7/2011 | Serrano |
| 2011/0227787 A1 | 9/2011 | Gum |
| 2011/0261917 A1 | 10/2011 | Bedrosian |
| 2011/0285586 A1 | 11/2011 | Ferguson |
| 2011/0287779 A1 | 11/2011 | Harper |
| 2012/0005326 A1 | 1/2012 | Bradetich |
| 2012/0026037 A1 | 2/2012 | Thomson |
| 2012/0030495 A1 | 2/2012 | Chandhoke |
| 2012/0066418 A1 | 3/2012 | Foster |
| 2012/0116677 A1 | 5/2012 | Higgison |
| 2012/0179404 A1 | 7/2012 | Lee |
| 2012/0182181 A1 | 7/2012 | Dai |
| 2012/0195253 A1 | 8/2012 | Irvine |
| 2012/0195350 A1 | 8/2012 | Das |
| 2012/0323397 A1 | 12/2012 | Schweitzer, III |
| 2013/0157593 A1 | 6/2013 | Achanta |
| 2013/0244624 A1 | 9/2013 | Das |
| 2013/0328606 A1 | 12/2013 | Ravi |
| 2013/0335266 A1 | 12/2013 | Vollath |
| 2014/0003199 A1 | 1/2014 | Dougan |
| 2014/0094218 A1 | 4/2014 | Hammes |
| 2014/0100702 A1 | 4/2014 | Schweitzer |
| 2014/0232595 A1* | 8/2014 | Rife ......................... G01S 19/20 342/357.58 |
| 2014/0250972 A1 | 9/2014 | Achanta et al. |
| 2014/0334477 A1 | 11/2014 | Stahlin |

OTHER PUBLICATIONS

Tippenhauer, N.O., Popper, C., Rasmussen, K.B., Capkun, S., On the Requirements for Successful GPS Spoofing Attacks, in Proceedings of the ACM Conference on Computer and Communications Security (CCS), Oct. 2011.

Moore, P., Crossley, P., GPS Applications in Power Systems Part 1 Introduction to GPS, Tutorial: GPS in Power Systems, Power Engineering Journal, Feb. 1999.

Jafarnia-Jahromi, A., Broumandan, A., Nielsen, J., Lachapelle, G., "GPS Vulnerability to Spoofing Threats and a Review of Antispoofing Techniques", International Journal of Navigation and Observation vol. 2012, Article ID 127072, Feb. 2012.

Wullems, C., "A Spoofing Detection Method for Civilian L1 GPS and the E1-B Galileo Safety of Life Service". IEEE Transactions on Aerospace and Electronic Systems, Aug. 2011.

Wen, H., Huang, P. Y., Dyer, J., Archinal, A., Fagan, J., "Countermeasures for GPS Signal Spoofing," Proceedings of the 18th International Technical Meeting of the Satellite Division of the Institute of Navigation (ION GNSS 2005), Long Beach, CA, Sep. 2005, pp. 1285-1290.

Gurtner, W., Estey, L., "Rinex: The Receiver Independent Exchange Format Version 3.00", Nov. 28, 2007.

Gurtner, W., "Rinex: The Receiver Independent Exchange Format Version 2", Sep. 2008.

PCT/US2013/064012, Patent Cooperation Treaty, International Search Report and Written Opinion of the International Searching Authority, Dec. 19, 2013.

PCT/US2014/010507 Patent Cooperation Treaty, International Search Report and Written Opinion of the International Searching Authority, May 6, 2014.

PCT/US2013/058297, Patent Cooperation Treaty, International Search Report and Written Opinion of the International Searching Authority, Feb. 14, 2014.

PCT/US2013/065695, Patent Cooperation Treaty, International Search Report and Written Opinion of the International Searching Authority, Mar. 10, 2014.

PCT/US2013/065447, Patent Cooperation Treaty, International Search Report and Written Opinion of the International Searching Authority, Mar. 13, 2014.

PCT/US2015/054144 Patent Cooperation Treaty, International Search Report and Written Opinion of the International Searching Authority, Jan. 4, 2016.

PCT/US2014/049813 Patent Cooperation Treaty, International Search Report and Written Opinion of the International Searching Authority, Apr. 2, 2015.

PCT/US2015/029939 Patent Cooperation Treaty, International Search Report and Written Opinion of the International Searching Authority, Aug. 12, 2015.

PCT/US2014/034358 Patent Cooperation Treaty, International Search Report and Written Opinion of the International Searching Authority, Sep. 22, 2014.

Shepard, D., Humphreys, T., Fansler, A., "Evaluation of the Vulnerability of Phasor Measurement Units to GPS Spoofing Attacks", Oct. 2, 2011.

PCT/US2014/010422 Patent Cooperation Treaty, International Search Report and Written Opinion of the International Searching Authority, Sep. 16, 2014.

Zhou et al., Adaptive Correction Method for an OCXO and Investigation of Analytic Cumulative Time Error Upper Bound, Jan.

(56) References Cited

OTHER PUBLICATIONS

2011, IEEE Transactions on Ultrasonics, Ferroelectrics, and Frequency Control, vol. 58, No. 1, pp. 43-50.
PCT/US2015/024000 Patent Cooperation Treaty, International Search Report and Written Opinion of the International Searching Authority, Jul. 13, 2015.

* cited by examiner

MULTI-CONSTELLATION GNSS INTEGRITY CHECK FOR DETECTION OF TIME SIGNAL MANIPULATION

RELATED APPLICATION

The present application claims the benefit under 35 U.S.C. §119(e) of U.S. Provisional Patent Application No. 61/751,746 filed Jan. 11, 2013 and titled "Multi-Constellation GNSS Integrity Check for Detection of Time Signal Manipulation" which application is incorporated herein by reference in its entirety.

TECHNICAL FIELD

This disclosure relates to a satellite synchronized clock capable of detecting manipulated satellite signals. More particularly, this disclosure relates to detecting manipulation of a first satellite constellation using a second satellite constellation.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

Figure 1:
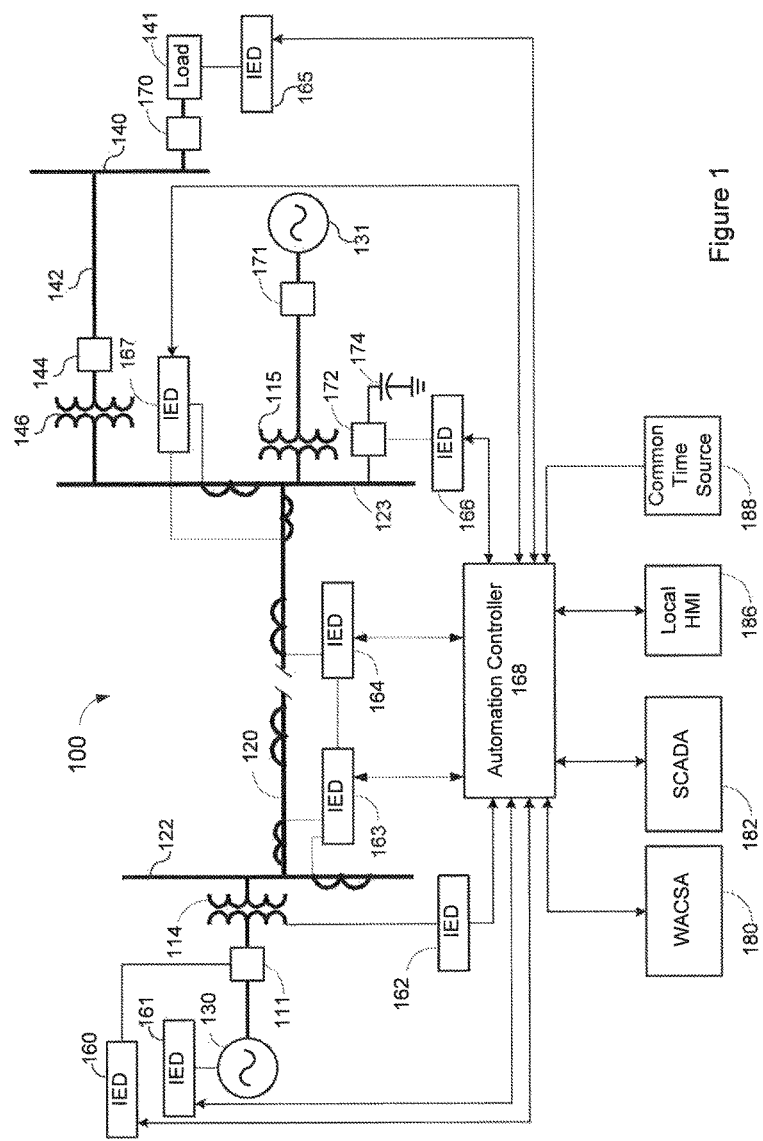
FIG. 1 illustrates a simplified one-line diagram of an electric power delivery system.

The embodiments of the disclosure will be best understood by reference to the drawings, wherein like parts are designated by like numerals throughout. It will be readily understood that the components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified.

In some cases, well-known features, structures, or operations are not shown or described in detail. Furthermore, the described features, structures, or operations may be combined in any suitable manner in one or more embodiments. It will also be readily understood that the components of the embodiments as generally described and illustrated in the figures herein could be arranged and designed in a wide variety of different configurations.

Several aspects of the embodiments described may be illustrated as software modules or components. As used herein, a software module or component may include any type of computer instruction or computer executable code located within a memory device and/or transmitted as electronic signals over a system bus or wired or wireless network. A software module or component may, for instance, comprise one or more physical or logical blocks of computer instructions, which may be organized as a routine, program, object, component, data structure, etc., that performs one or more tasks or implements particular abstract data types.

In certain embodiments, a particular software module or component may comprise disparate instructions stored in different locations of a memory device, which together implement the described functionality of the module. Indeed, a module or component may comprise a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a machine-readable medium having stored thereon instructions that may be used to program a computer (or other electronic device) to perform processes described herein. The machine-readable medium may include, but is not limited to, hard drives, floppy diskettes, optical disks, CD-ROMs, DVD-ROMs, ROMs, RAMs, EPROMs, EEPROMs, magnetic or optical cards, solid-state memory devices, or other types of non-transitory machine-readable media suitable for storing electronic instructions.

FIG. 1 illustrates a simplified diagram of an example of an electric power delivery system 100 consistent with embodiments disclosed herein. The systems and methods described herein may be applied and/or implemented in the electric power delivery system 100 illustrated in FIG. 1. Although illustrated as a one-line diagram for purposes of simplicity, an electrical power delivery system 100 may also be configured as a three-phase power system. The electric power delivery system 100 may include electric generators 130 and 131 configured to generate an electrical power output, which in some embodiments may be a sinusoidal waveform.

Generators 130 and 131 may be selectively connected to the electric power delivery system using switches or circuit breakers 111 and 171, respectively. Step-up transformers 114 and 115 may be configured to increase the output of the electric generators 130 and 131 to higher voltage sinusoidal waveforms. Buses 122 and 123 may distribute the higher voltage sinusoidal waveform to a transmission line 120 between buses 122 and 123. Step-down transformer 146 may decrease the voltage of the sinusoidal waveform from bus 123 to a lower voltage suitable for electric power distribution on line 142. Distribution line 142 is further selectively connectable to bus 123 via circuit breaker or switch 144, and may distribute electric power to a distribution bus 140. Load 141 (such as a factory, residential load, motor, or the like) may be selectively connected to distribution bus 140 using switch or circuit breaker 170. It should be noted that additional transformers or other equipment may be used to further step down a voltage from the distribution bus 140 to the load 141.

Various other equipment may be included in the electric power delivery system. Also illustrated is switched capacitor bank ("SCB") 174 selectively connectable to transmission bus 123 using circuit breaker or switch 172. Other equipment that may be included in the electric power delivery system may include, for example, static VAR compensators, reactors, load tap changers, voltage regulators, autotransformers, and the like. Some of these are considered as included in the electric power system 100 such as, for example, load tap changers can be considered as part of the load 141. Generators 130 and 131 may be any generator capable of providing electric power to the electric power delivery system and may include, for example, synchronous generators, turbines (such as hydroelectric turbines, wind turbines, gas-fired, coal-fired, and the like), photovoltaic electric generators, tidal generators, wave power generators, and the like. Such generation machines may include components such as power-electronically coupled interfaces, for example, doubly-fed induction machines, direct coupled AC-DE/DE-AC transfer devices, and the like. It should be noted that these are not exhaustive lists, and other equipment, machines, and connected devices may be considered under this disclosure.

Modern electric power delivery systems (which may include electric power generation systems, transmission systems, distribution systems, and consumption systems) are typically controlled using intelligent electronic devices (IEDs). FIG. 1 illustrates several IEDs 160-167 that may be configured to control one or more elements of the electric power delivery system. An IED may be any processor-based device that controls monitored equipment within an electric power delivery system (e.g., system 100). In some embodiments, the IEDs 160-167 may gather equipment status from one or more pieces of monitored equipment (e.g., generator 130). Equipment status may relate to the status of the monitored equipment, and may include, for example, breaker or switch status (e.g., open or closed), valve position, tap position, equipment failure, rotor angle, rotor current, input power, automatic voltage regulator state, motor slip, reactive power control set point, generator exciter settings, and the like. Further, the IEDs 160-167 may receive measurements concerning monitored machines or equipment using sensors, transducers, actuators, and the like. Measurements may relate to a measured status of the machine or equipment, and may include, for example, voltage, current, temperature, pressure, density, infrared absorption, viscosity, speed, rotational velocity, mass, and the like. With the equipment status and/or measurements, IEDs may be configured to derive or calculate derived values, for example, power (real and reactive), magnitudes and angles of voltages and currents, frequency, rate of change of frequency, phasors, synchrophasors, fault distances, differentials, impedances, reactances, symmetrical components, alpha components, Clarke components, alarms, and the like.

According to certain embodiments, IEDs 160-167 may issue control instructions to the monitored equipment in order to control various aspects relating to the monitored equipment. Some examples of actions to control equipment include: opening a breaker which disconnects a generator with a rotor angle moving towards instability; opening a breaker which sheds load that is causing a voltage to decline towards a collapsing condition; opening a breaker to remove an asset when the asset, such as a line or transformer, is exceeding its safe operating limits; opening a breaker which sheds load that is causing the frequency of the system to decline such that it is exceeding predefined operating limits; inserting shunt capacitance with the effect of increasing the voltage on an electric power line so that the reactive requirements on a generator are not exceeded and therefore pre-emptively preventing the generator from being removed from service by a reactive power control; activating a dynamic brake which counters the acceleration of a machine rotor; adjusting a set-point on a governor to limit the power output of a synchronous machine so that it does not exceed the safe operating limits; simultaneously adjusting set-points of other synchronous machines so that they pick-up the new load; and, adjusting a voltage regulation set-point of an automatic voltage regulator such that a voltage at a more distant point in the power system does not exceed its maximum or minimum voltage threshold; and the like.

An IED (e.g., IED 160) may be in communication with a circuit breaker (e.g., breaker 111), and may be capable of sending an instruction to open and/or close the circuit breaker, thus connecting or disconnecting a portion of a power system. In another example, an IED may be in communication with a recloser and capable of controlling reclosing operations. In another example, an IED may be in communication with a voltage regulator and capable of instructing the voltage regulator to tap up and/or down. Information of the types listed above, or more generally, information or instructions directing an IED or other device or equipment to perform a certain action, may be generally referred to as control instructions.

IEDs 160-167 may be communicatively linked together using a data communications network, and may further be communicatively linked to a central monitoring system, such as a supervisory control and data acquisition (SCADA) system 182, and/or a wide area control and situational awareness (WACSA) system 180. In certain embodiments, various components of the electrical power generation and delivery system 100 illustrated in FIG. 1 may be configured to generate, transmit, and/or receive GOOSE messages, or communicate using any other suitable communication protocol. For example, an automation controller 168 may communicate certain control instructions to IED 163 via messages using a GOOSE communication protocol.

The illustrated embodiments are configured in a star topology having an automation controller 168 at its center, however, other topologies are also contemplated. For example, the IEDs 160-167 may be communicatively coupled directly to the SCADA system 182 and/or the WACSA system 180. Certain IEDs, such as IEDs 163 and 164, may be in direct communication with each other to effect, for example, line differential protection of transmission line 120. The data communications network of the system 100 may utilize a variety of network technologies, and may comprise network devices such as modems, routers, firewalls, virtual private network servers, and the like. Further, in some embodiments, the IEDs 160-167 and other network devices (e.g., one or more communication switches or the like) may be communicatively coupled to the communications network through a network communications interface.

Consistent with embodiments disclosed herein, IEDs 160-167 may be communicatively coupled with various points to the electric power delivery system 100. For example, IEDs 163 and 164 may monitor conditions on transmission line 120. IED 160 may be configured to issue control instructions to associated breaker 111. IEDs 163, and 167 may monitor conditions on buses 122, and 123. IED 161 may monitor and issue control instructions to the electric generator 130. IED 162 may monitor and issue control instructions to transformer 114. IED 166 may control operation of breaker 172 to connect or disconnect SCB 174. IED 165 may be in communication with load center 141, and may be configured to meter electric power to the load center. IED 165 may be configured as a voltage regulator control for regulating voltage to the load center using a voltage regulator (not separately illustrated).

In certain embodiments, communication between and/or the operation of various IEDs 160-167 and/or higher level systems (e.g., SCADA system 182 or WACSA 180) may be facilitated by an automation controller 168. The automation controller 168 may also be referred to as a central IED, communication processor, or access controller. In various embodiments, the automation controller 168 may be embodied as the SEL-2020, SEL-2030, SEL-2032, SEL-3332, SEL-3378, or SEL-3530 available from Schweitzer Engineering Laboratories, Inc. of Pullman, Wash., and also as described in U.S. Pat. No. 5,680,324, U.S. Pat. No. 7,630,863, and U.S. Patent Application Publication No. 2009/0254655, the entireties of which are incorporated herein by reference.

The IEDs 160-167 may communicate a variety of types of information to the automation controller 168 including, but not limited to, operational conditions, status and control information about the individual IEDs 160-167, event (e.g., a fault) reports, communications network information, network security events, and the like. In some embodiments, the automation controller 168 may be directly connected to one or more pieces of monitored equipment (e.g., electric generator 130 or breakers 111, or 172).

The automation controller 168 may also include a local human machine interface (HMI) 186. In some embodiments, the local HMI 186 may be located at the same substation as automation controller 168. The local HMI 186 may be used to change settings, issue control instructions, retrieve an event report (which may originate from a specified IED), retrieve data, and the like. The automation controller 168 may further include a programmable logic controller accessible using the local HMI 186.

The automation controller 168 may also be communicatively coupled to a common time source (e.g., a clock) 188. In certain embodiments, the automation controller 168 may generate a time signal based on the common time source 188 that may be distributed to communicatively coupled IEDs 160-167. Alternatively, IEDs may be individually connected to a common time source. Based on the time signal, various IEDs 160-167 may be configured to collect and/or calculate time-aligned operational conditions including, for example, synchrophasors, and to implement control instructions in a time coordinated manner. IEDs may use the time information to apply a time stamp to operational conditions and/or communications. In some embodiments, the WACSA system 180 may receive and process the time-aligned data, and may coordinate time synchronized control actions at the highest level of the electrical power generation and delivery system 100. In other embodiments, the automation controller 168 may not receive a time signal, but a common time signal may be distributed to IEDs 160-167.

The common time source 188 may also be used by the automation controller 168 for time stamping information and data. Time synchronization may be helpful for data organization, real-time decision-making, as well as post-event analysis. Time synchronization may further be applied to network communications. The common time source 188 may be any time source that is an acceptable form of time synchronization, including, but not limited to, a voltage controlled temperature compensated crystal oscillator, Rubidium and Cesium oscillators with or without digital phase locked loops, microelectromechanical systems (MEMS) technology, which transfers the resonant circuits from the electronic to the mechanical domains, or a Global Navigational Satellite System (GNSS) such as a Global Positioning System (GPS) receiver with time decoding. In the absence of a discrete common time source 188, the automation controller 168 may serve as the common time source 188 by distributing a time synchronization signal.

Several different GNSS systems (also referred to as GNSS constellations) are available or planned to be available. Some examples of a currently operational GNSS include the United States NAVSTAR Global Positioning System (GPS) system and the Russian GLONASS. Some examples of a GNSS planned for future operation include China's Beidou Navigation Satellite System (BDS), and the European Union's Galileo positioning system. It should be noted that a single GNSS system may include separate constellations (such as, for example, the BDS including a limited test system at a first constellation as well as a system being constructed at a second constellation).

As is detailed above, the electric power delivery system 100 illustrated in FIG. 1 includes local control and protection using IEDs 160-167, and wide-area control using the automation controller 168 and/or WACSA 180 and/or SCADA 182.

Figure 2:
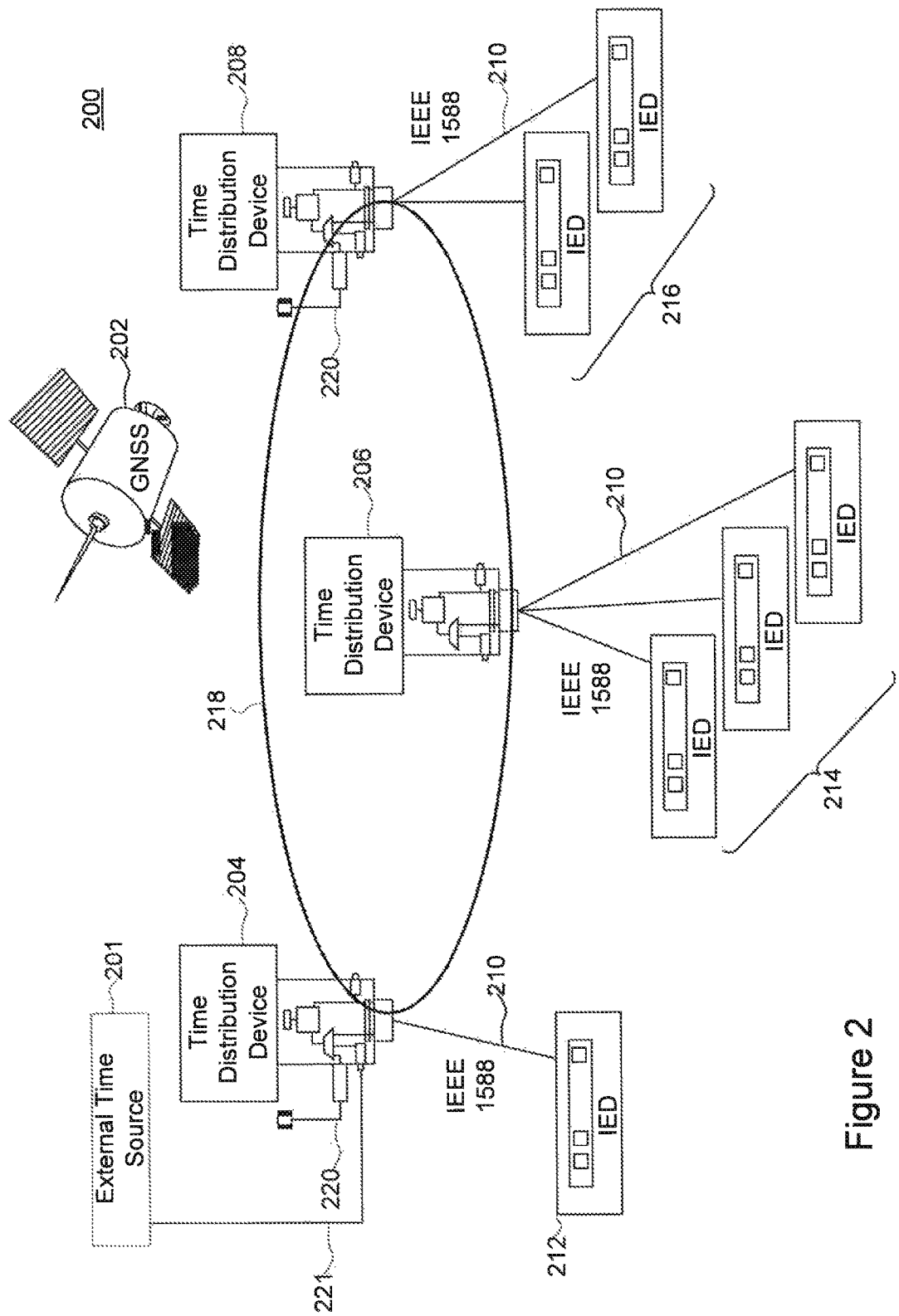
FIG. 2 illustrates an example system of reliable, redundant, and distributed time distribution devices.

FIG. 2 illustrates system 200 configured to be a highly reliable, redundant, and distributed system of time distribution devices 204, 206, and 208 capable of providing a precision time reference to various time dependent IEDs 212, 214, and 216. Each time distribution device 204, 206, and 208 may be configured to receive and communicate time signals through multiple protocols and methods. While the system 200 is described as being capable of performing numerous functions and methods, it should be understood that various systems are possible that may have additional or fewer capabilities. Specifically, a system 200 may function as desired using only one protocol, or having fewer external or local time signal inputs.

As illustrated in FIG. 2, three time distribution devices 204, 206, and 208 have WAN capabilities and are communicatively connected to a WAN 218, which may comprise one or more physical connections and protocols. Each time distribution device 204, 206, and 208 may also be connected to one or more IEDs within a local network. For example, time distribution device 204 is connected to IED 212, time distribution device 206 is connected to IEDs 214, and time distribution device 208 is connected to IEDs 216. A time distribution device may be located at, for example, a power generation facility, a distribution hub, a substation, a load center, or other location where one or more IEDs are found. In various embodiments, an IED may include a WAN port, and such an IED may be directly connected to WAN 218. IEDs may be connected via WAN 218 or LANs 210. Time distribution devices 204, 206, and 208 may establish and maintain a precision time reference among various system components. Each time distribution device 204, 206, and 208 may be configured to communicate time information with IEDs connected on its LAN through one or more time distribution protocols, such as IEEE 1588.

Each time distribution device 204, 206, and 208 is configured to receive time signals from a variety of time sources. For example, as illustrated, time distribution device 204 includes an antenna 220 and is configured to receive a GNSS signal from a GNSS repeater or satellite 202. Time distribution device 204 is also configured to receive a second time signal 221 from an external time source 201. The external time source may comprise one or more voltage-controlled temperature-compensated crystal oscillators (VCTCXOs), phase locked loop oscillators, time locked loop oscillators, rubidium oscillators, cesium oscillators, NIST broadcasts (e.g., WWV and WWVB), and/or other devices capable of generating precise time signals. In the illustrated embodiment, time distribution device 208 includes an antenna 220 configured to receive a GNSS signal from the GNSS repeater or satellite 202. As illustrated, time distribution device 206 does not directly receive an external time signal, however, according to alternative embodiments, any number and variety of external time signals may be available to any of the time distribution devices.

According to one embodiment, WAN 218 comprises a synchronous optical network (SONET) configured to embed a precision time reference in a header or overhead portion of a SONET frame during transmission. Alternatively, a precision time reference may be conveyed using any number of time communications methods including IRIG protocols, NTP, SNTP, synchronous transport protocols (STP), and/or IEEE 1588 protocols. According to various embodiments, including transmission via SONET, a precision time reference may be separated and protected from the rest of the WAN network traffic, thus creating a secure time distribution infrastructure. Protocols used for inter IED time synchronization may be proprietary, or based on a standard, such as IEEE 1588 Precision Time Protocol (PTP).

According to various embodiments, time distribution devices 204, 206, and 208 are configured to perform at least one of the methods of detecting failure of a time source described herein. System 200 may utilize a single method or combination of methods, as described herein.

It is of note that even the most precise time signals may exhibit small discrepancies. For example, depending on the length and routing of the GNSS antenna cable, various clocks may exhibit microsecond level time offsets. Some of these offsets may be compensated for by the user entering compensation settings, or may need to be estimated by the time synchronization network. Estimation may be performed during long periods of "quiet" operation (i.e., periods with no faults), with the individual source results stored locally in a nonvolatile storage register.

As can be seen, IEDs may receive time signals from one or more GNSS signals. Different IEDs may receive time signals from one or more GNSS signal sources that are different from the GNSS signal sources for other IEDs. That is, several different GNSS sources are available. The GPS system, for example, consists of around 32 satellites that orbit the Earth twice per sidereal day. Accordingly, several satellites are visible to each receiver at any given time, and different satellites may be visible to different receivers at different times each day.

Signals from the GNSS satellites arrive at the receivers, and may be used by the receivers to calculate position as well as time. Receivers in the systems of FIGS. 1 and 2 are typically stationary, using the GNSS signals to calculate time, and provide a common time to devices on the system.

Receivers of such signals may be vulnerable to attacks or manipulation such as blocking, jamming, and spoofing. In some cases, the GNSS receiver may continue to indicate that the signal is good, and signal lock may be maintained. Such attacks may attempt to prevent a position lock, or feed a receiver false information such that the receiver calculates a false position and/or time. Spoofing, or other manipulation, of time information in a system such as those of FIGS. 1 and 2 may introduce errors in the derived values by the IEDs, and/or errors into time stamps of equipment status, measurements, derived values, and communications among the devices. Such errors may result in improper control of the electric power delivery system. Accordingly, what is needed is detection of, and mitigation against such attacks.

Figure 3:
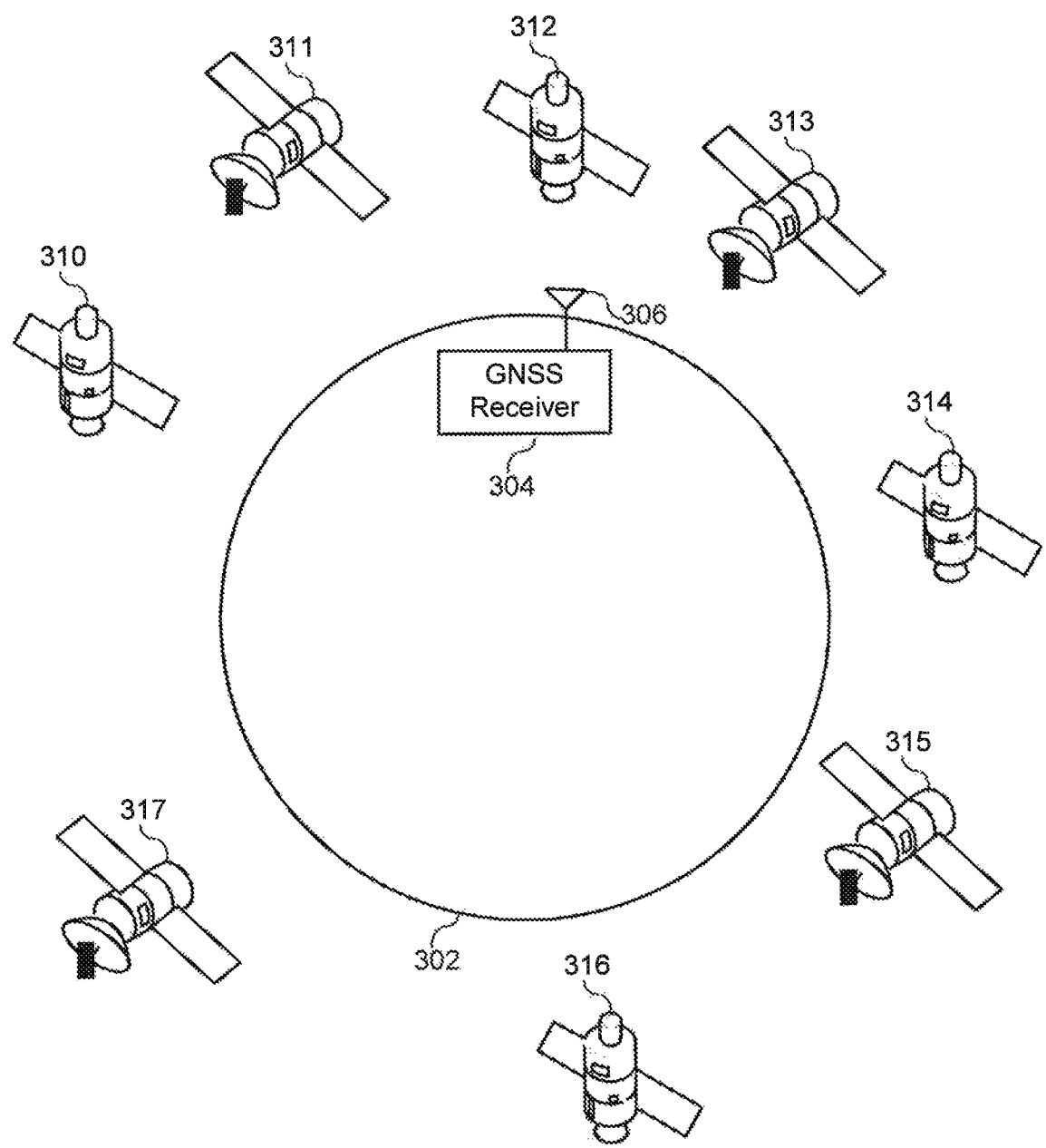
FIG. 3 illustrates GNSS receiver in communication with subsets of two GNSS satellite constellations.

FIG. 3 illustrates a representation of a number of satellites (310-317) positioned around the Earth 302. A GNSS receiver 304 may be located at a stationary position, or may be mobile upon the Earth 302. The satellites 310-317 may constitute multiple constellations. As illustrated, a first constellation includes satellites 310, 312, 314, and 316, where a second constellation includes satellites 311, 313, 315, and 317. GNSS receiver 304 may be configured to receive signals from satellites of the first and second constellations via an antenna 306. For example, the first constellation may include satellites of the GPS system, and the second constellation may include satellites of the GLONASS system.

Figure 4:
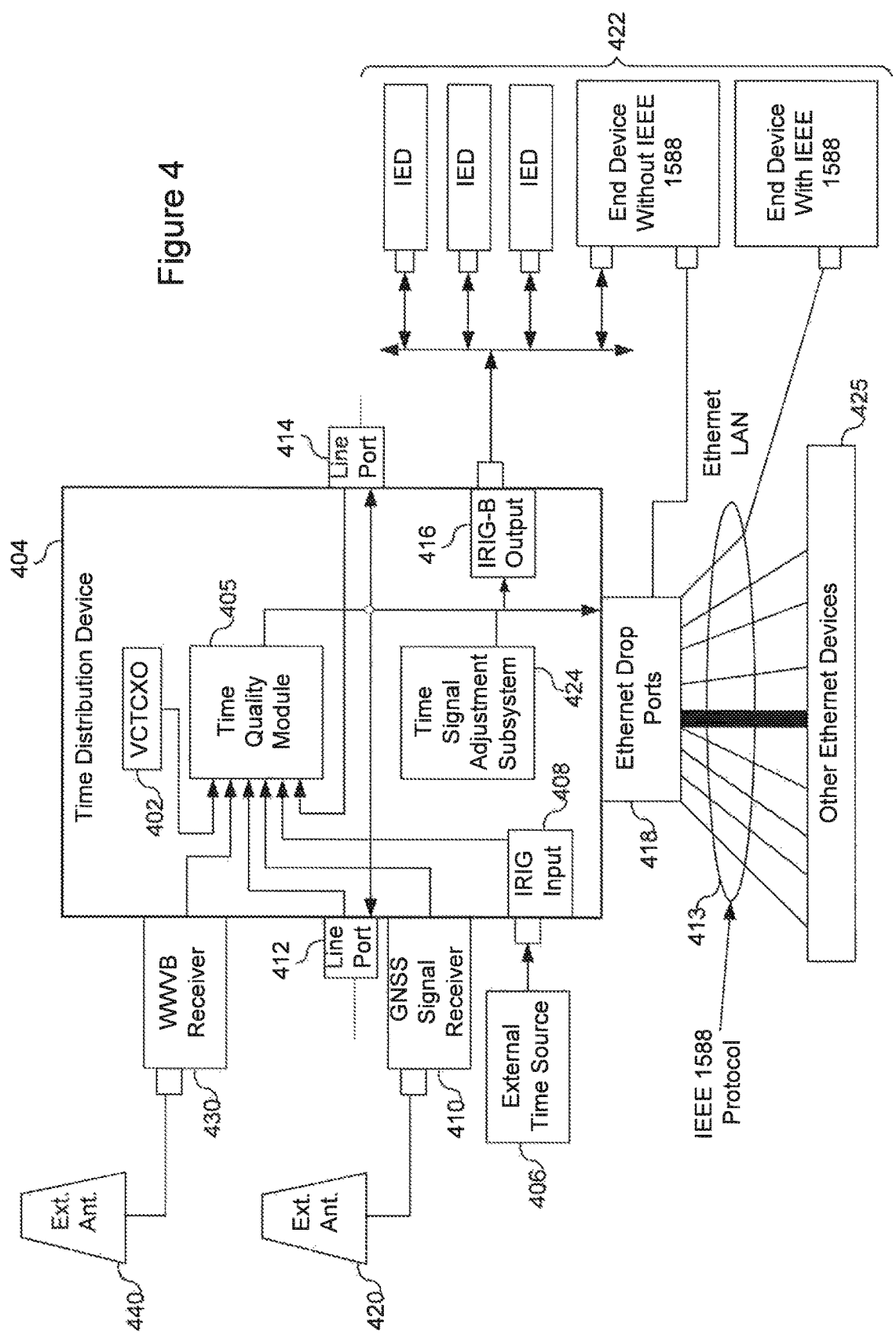
FIG. 4 illustrates a time distribution device for providing a time signal to one or more consuming devices.

FIG. 4 illustrates a time distribution device 404, according to one embodiment, for providing a time signal to one or more consuming devices. In various embodiments, time distribution device 404 may include more or less functionality than the illustration. For example, time distribution device 404 may include an interface for monitoring equipment in an electric power delivery system in certain embodiments. Accordingly, in various embodiments, time distribution device 404 may be implemented either as an IED or as a network device. As illustrated, time distribution device 404 includes a local time source 402 such as a voltage-controlled temperature-compensated crystal oscillator (VCTCXO), temperature-compensated crystal oscillator (TCXO), oven-controlled crystal oscillator (OCXO), or the like, that provides a local time signal and a time quality module 405 for establishing a precision time reference. Time distribution device 404 further includes a pair of line ports 412 and 414 for communications with a WAN or LAN. Time information may be shared over a network and may also be fed into the time quality module 405. Further, time distribution device 404 includes a GNSS signal receiver 410 for receiving a precision time signal, such as time from a GNSS via a GNSS antenna 420. Time distribution device 404 also includes a WWVB receiver 430 for receiving an NIST broadcast, which can be used as a precision time signal, via an external antenna 440. The received precision time signal from either source is communicated to the time quality module 405 for use in determining and distributing the precision time reference.

Another time source that may be fed to the time quality module 405 includes an external time source 406 that may conform to a time distribution protocol, such as IRIG. The external time source 406 may communicate with another time port such as an IRIG input 408.

The various time information from the WAN (from line ports 412 and/or 414), GNSS signal receiver 410, WWVB receiver 430, and IRIG input 408 are input into the time quality module 405. In one embodiment, the inputs may be fed into a multiplexer (not shown) prior to being input into the time quality module 405. The time quality module 405 functions to determine a precision time reference for use by the various devices connected to the GNSS receiver 404. The precision time reference is then communicated from the time quality module 405 to the various devices 422 using IRIG protocol (via the IRIG-B output 416) or to various Ethernet devices 425 using another protocol 413 such as IEEE 1588 using Ethernet Drop Ports 418. The Ethernet Drop Ports 418 may also include network communications to the various devices connected to GNSS receiver 404. GNSS receiver 404 may further include connections to SONETs and transmit the precision time reference in a header or overhead portion of SONET frames.

Time distribution device 404 may also comprise a time signal adjustment subsystem 424. Time signal adjustment subsystem 424 may be configured to track drift rates associated with various external time sources with respect to local time source 402. Time signal adjustment subsystem 424 may also communicate time signals according to a variety of protocols. Such protocols may include inter-Range Instrumentation Group protocols, IEEE 1588, Network Time Protocol, Simple Network Time Protocol, synchronous transport protocol, and the like. In various embodiments, time signal adjustment subsystem 424 may be implemented using a processor in communication with a computer-readable storage medium containing machine executable instructions. In other embodiments, time signal adjustment subsystem 424 may be embodied as hardware, such as an application specific integrated circuit or a combination of hardware and software.

As mentioned above, the time distribution device 404 may obtain GNSS signals from multiple GNSS systems or constellations. For example, the GNSS signal receiver 410 may be configured to obtain satellite signals from GPS, GLONASS, Galileo, BDS, and the like. The GNSS systems may provide a time signal such as a pulse-per-second (PPS) signal. Using the PPS signal from each of the constellations, time distribution device 404 may determine a phase error between the time signals of two or more of the constellations. If the phase error changes, time distribution device 404 may be configured to determine that one of the signals has been manipulated.

Figure 5:
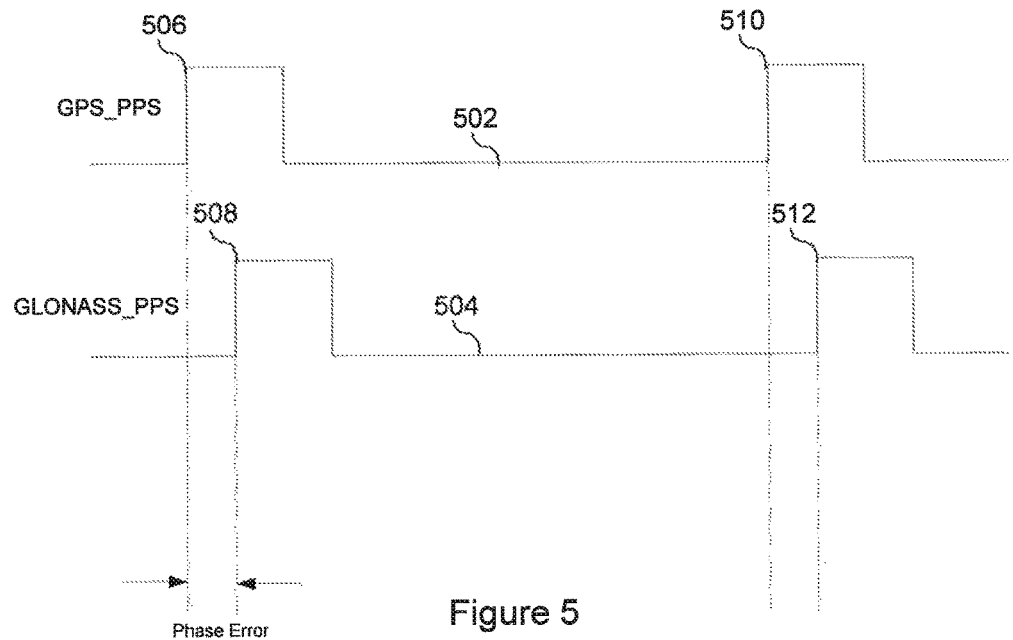
FIG. 5 illustrates a timing diagram of two GNSS constellations.

FIG. 5 illustrates a timing diagram 502 of a PPS signal from the GPS system, and another timing diagram 504 of a PPS signal from the GLONASS system. As can be seen, the rising edge 506 of the first PPS of the GPS signal is slightly ahead of the rising edge 508 of the first PPS signal from the GLONASS signal. The time quality module 405 of the GNSS receiver 404 may calculate a phase error as a difference in time between these rising edges. In another embodiment, the time quality module 405 may use a time signal from the local time source to determine a phase error of any GNSS PPS by comparing the PPS with, for example a local oscillator. The time quality module 405 may continue to calculate the phase error for each subsequent PPS signal from the GPS system 510 and from the GLONASS system 512.

If the time quality module detects a drift in the phase error between the two signals, the time quality module may determine that one of the GNSS signals received by the GNSS receiver 410 may be manipulated. Accordingly, the time quality module 405 may continue to monitor the phase error between two GNSS signals. When the phase error drifts beyond a predetermined threshold, the time distribution device 404 may take a remedial action.

According to various embodiments, the time quality module 405 computes the phase error between the two rising edges (e.g., 506 to 508 and 510 to 512) of the timing signals. In one embodiment, an average of the phase errors may be calculated. The average may be calculated using a moving average window and stored in memory. In the event that one of the GNSS signals is being manipulated, the signal from the manipulated constellation may begin drifting and the phase error between the signals may change. For example, if the GLONASS signal 504 of FIG. 5 were being manipulated, the rising edges of its PPS may begin to lag further behind the rising edges of the GPS PPS signal 502. Accordingly, the phase error between the signals would increase. Alternatively, if the GPS PPS signal 502 were being manipulated, the rising edges of its PPS may slow down, which would decrease the phase error between the GPS signal 502 and the GLONASS signal 504 for a period of time, until the rising edges were coincident, after which the phase error would increase. Phase error changes may further be brought about by a manipulated signal increasing a rate of PPS rising edges.

Figure 6:
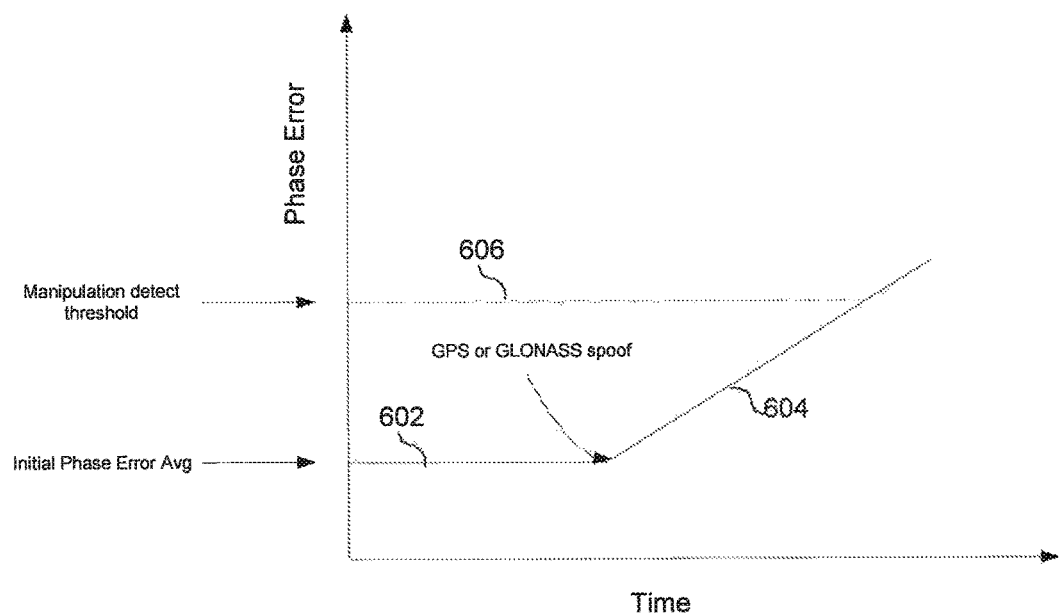
FIG. 6 illustrates a phase error plot of two GNSS constellations.

FIG. 6 illustrates an example change in phase error over time of the signals illustrated in FIG. 5 during normal operation 602 and during manipulation of one of the signals 604. Also illustrated is a manipulation detection threshold 606 that may be a predetermined threshold. Once the phase error crosses the threshold 606, the GNSS receiver 404 may take the remedial action.

In one embodiment, the time quality module 405 may determine the initial phase error 602 and store the initial phase error 602 in memory. The time quality module 405 may continuously monitor the phase error between the two GNSS constellations. The phase error may be calculated in real time and filtered for several samples to avoid false positives. Once the filtered absolute phase error is determined to exceed a pre-determined threshold, the time quality module 405 may detect manipulation. The threshold may be an absolute phase error. The threshold may be, for example, approximately 1 microsecond.

In one example, the time quality module 405 may determine the initial phase error to be 50 nanoseconds. The time quality module 405 may continuously monitor the phase error. Once the phase error exceeds a threshold (such as, for example, 1 microsecond), the time quality module 405 may detect the manipulation, and take a remedial action.

In one embodiment, the time distribution device 404 may receive GNSS signals from more than two constellations. In such an embodiment, the time quality module 405 may calculate initial phase errors between each of the signals from each of the GNSS constellations, and monitor such phase errors. When one of the GNSS constellations is manipulated, its phase error relative to the other GNSS constellation signals may change. The time quality module 405 may detect such a change and determine that the signal has been manipulated. The time quality module 405 may further determine which GNSS constellation signal is being manipulated using a voting scheme. For example, if three GNSS constellations are monitored, the time quality module 405 may determine that the two GNSS constellations with the smallest (or no) relative phase error are not the manipulated GNSS constellations.

As introduced above, when the time quality module 405 has detected manipulation, the time distribution device 404 may take remedial action to avoid propagating inaccurate time data. The remedial action may include, for example: ceasing to rely on the GNSS signals and instead distribute time from its own local time source; switching to a non-GNSS signal such as WWVB, or another external time source; determining which GNSS signal is being manipulated and ceasing to use that GNSS signal; use an accurate internal time source such as a crystal oscillator or a Cesium standard; sending an alarm to an operator; communicating to receiving devices that the time signal may have been manipulated (by setting an error bit or the like); and the like.

Figure 7:
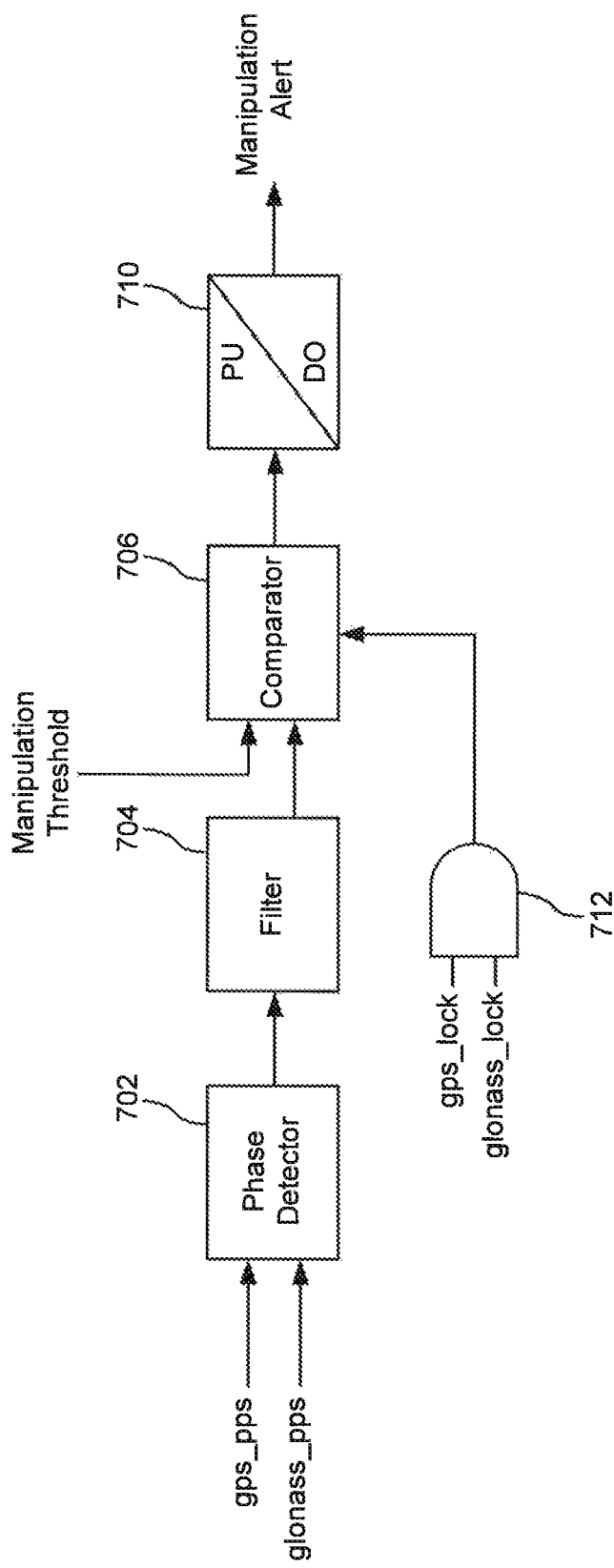
FIG. 7 illustrates an example of a time quality module configured to detect manipulation of a GNSS signal based on phase error.

FIG. 7 illustrates an example of a time quality module configured to detect manipulation of a GNSS signal based on phase error. The time quality module may include a phase detector 702, a filter 704, a comparator 706, a pick-up and drop-out timer block 710, and enablement logic 712. In various embodiments, the components of the time quality module may be implemented as software instructions carried out by a processor, dedicated hardware, and/or firmware. In one embodiment, the components are implemented by one or more FPGAs. In the example of FIG. 7, the phase detector 702 is configured to receive time signals, for example, a pulse-per-second (PPS) signal from two GNSS constellations (e.g., GPS and GLONASS). The phase detector is configured to determine a phase error between the two time signals. For example, in one embodiment, the phase detector 702 may include a clock, or receive a clock signal, and determine an error (or difference) in clock counts between the two time signals.

The phase error determined by the phase detector 702 may be passed through a filter 704 to smooth out any abrupt variations in the detected phase error. In one embodiment, filter 704 may be a low pass filter. In another embodiment, the filter 7084 may be a simple moving average filter with saturation limits. The filtered phase error may be passed to a comparator 706 configured to compare the phase error with a manipulation threshold value. The manipulation threshold value, as described above, may be user defined or determined based on historical phase error data. As shown in the example of FIG. 7, the comparator may be enabled by enablement logic 712 when the time distribution module has a lock on both of the first and the second GNSS constellation in order to reduce the risk of a false manipulation signal when a GNSS lock has been lost.

The output of comparator 706 indicates whether possible manipulation of one of the GNSS constellations has been detected. For example, the comparator 706 may output a logic '1' when the filtered phase error exceeds the manipulation threshold value and a logic '0' otherwise. In one embodiment, the output of the comparator 706 may be used directly to indicate manipulation. However, this may lead to frequent false manipulation alerts due to a noisy time signal, for example. Timer block 710 provides some hysteresis to help smooth out some of the possible false manipulation alerts. The timer block 710, in the example of FIG. 7, may be configured to track the output of the comparator, which has a refresh rate of 1 Hz, and indicate manipulation if a defined number of cycles that the comparator has detected the phase error exceeds the threshold (i.e., outputs a logic '1'). In one embodiment, the pick-up (PU) of the timer block 710 may be set such that detecting ten consecutive samples of a logic '1' results in the timer block 710 outputting a manipulation alert. The drop-out (DO) of the timer block may be set, for example, such that detecting three consecutive samples of a logic '0' results in the timer block ceasing to output the manipulation alert.

Figure 8:
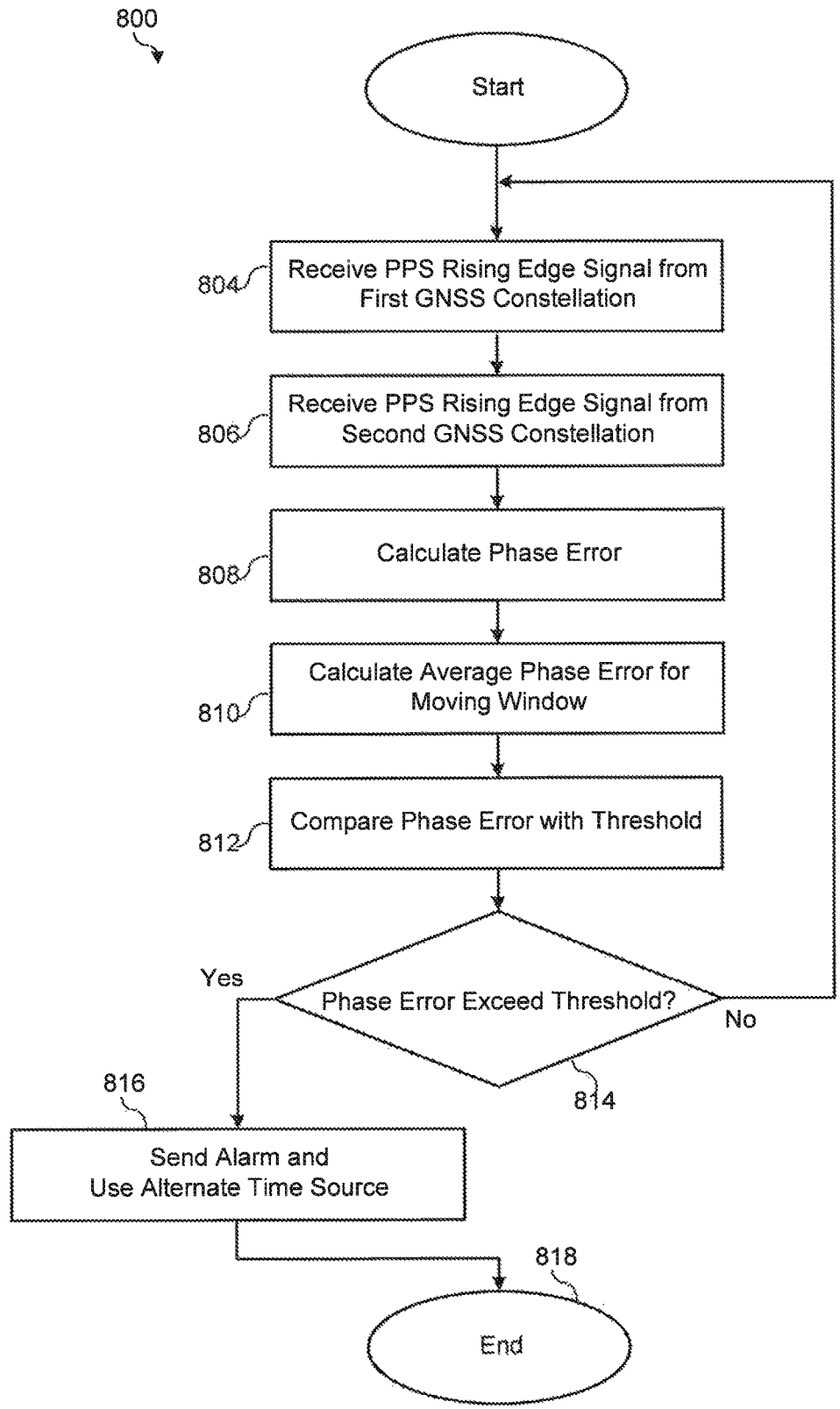
FIG. 8 illustrates a plot showing possible manipulation of a single GNSS constellation.

FIG. 8 illustrates a method for detecting manipulation of a GNSS constellation signal according to the techniques introduces herein. The method 800 may start with the time distribution device 404 receiving a PPS rising edge signal from a first GNSS constellation 804 and receiving a PPS rising edge signal from a second GNSS constellation 806. As described above, the time quality module 405 may calculate the phase error 808. Although not specifically illustrated, the PPS rising edges from the first and second GNSS constellations may continue to be received, and a phase error may be calculated for each.

The time quality module 405 may calculate an average phase error for a moving window 810 using the calculated phase errors. The phase error may be compared with a threshold 812. If the phase error exceeds the threshold 814, manipulation may be detected, an alarm may be sent (via a human-machine interface (HMI), over a communications network, or the like) and an alternate time source may be used 816. The alternate time source may be an internal time source, another external time source, or the like.

The method may include other remedial actions as described above including, for example, determining which GNSS constellation signal is manipulated, and the like. Additionally, the time quality module may be able to determine which GNSS constellation signal has been manipulated by calculating a location based on the GNSS constellation signal. In various embodiments, the time distribution device is at a fixed location. The GNSS receiver may calculate a location based on the GNSS constellation signal and the time quality module may compare the calculated location to the known fixed location of the time distribution device. If the calculated location and the fixed location vary beyond a defined threshold, the time quality module may determine that the GNSS constellation signal has been manipulated.

According to one embodiment, the time distribution device 404 may be configured to detect manipulation of a time signal using a local time source. As described above, the time distribution device 404 may include a local time source 402 such as a crystal oscillator. The local time source 402 may be selected for a very good short term frequency stability. The local time source 402 may be configured to produce a time signal such as a free running counter (FRC) that runs continuously. The FRC may count the number of clock counts between the rising edges of each incoming PPS pulses.

As noted above, the time distribution device 404 may include a number of time signal inputs. Each time signal input may undergo an integrity check in the time quality module 405. The integrity check may use the local time source 402 to perform the integrity check. In one embodiment, the time quality module 405 receives the FRC from the local time source. For each time input signal, the time quality module may store the FRC time stamp with each rising edge of the input signal. Under normal operating conditions, the FRC count value grows linearly with time.

Figure 9:
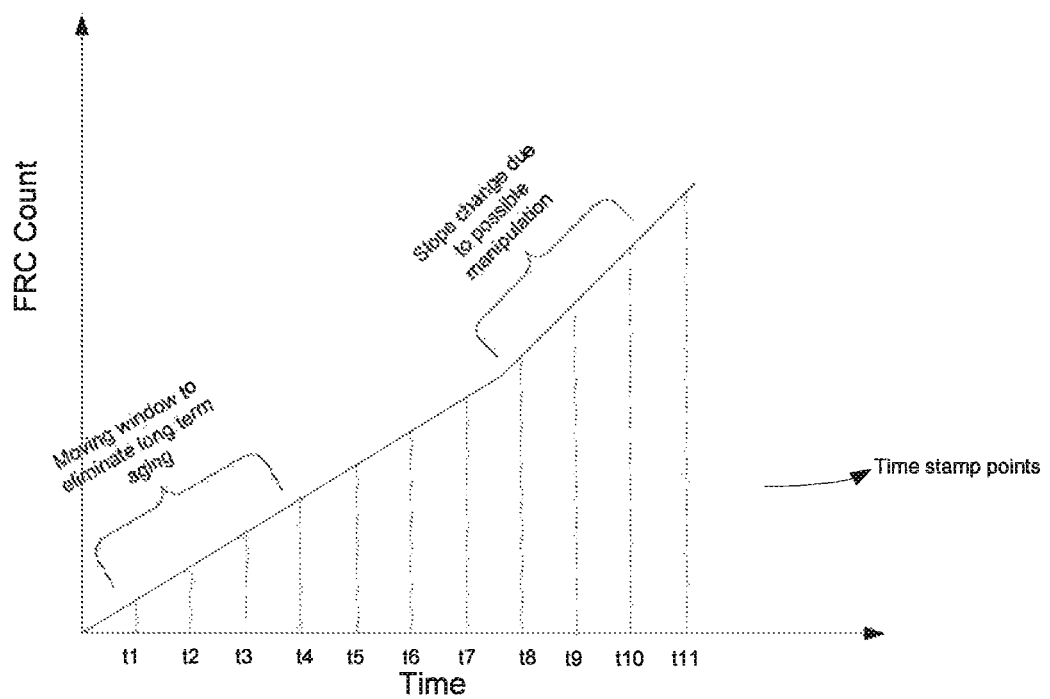
FIG. 9 illustrates a method for detecting manipulated GNSS signals using event times.

FIG. 9 illustrates how the FRC count values grow linearly with time under normal conditions, and that the growth may vary when a time source, such as a GNSS constellation, is being manipulated. The time stamps t1 through t11 correspond with the rising edges of a GNSS PPS signal and a particular FRC count value at that time. Between time stamp t1 and t7, the count value of the FRC between time stamps is constant (i.e., the slope of the plot is constant). However, in the example of FIG. 9, the slope of the plot changes at some point between t7 and t8, representing a change in the number of FRC counts between each time stamp. A change in the number of FRC counts between rising edges of a PPS signal (i.e., change in the slope of the time v. FRC count plot) may indicate manipulation of the GNSS signal.

The time quality module 405 may maintain a moving window to eliminate long term aging effects of the local time source 402. It should be noted that the slope change due to possible manipulation may be an increase or a decrease in slope, depending on whether the manipulation increases or decreases the rate of the manipulated PPS signal. That is, the number of FRC count values between the PPS pulses may increase or decrease for a manipulated signal. In one embodiment the FRC count value accumulates as the PPS pulses are received. FIG. 8 illustrates this as a positive slope. In one embodiment, the FRC count value may be reset periodically (i.e., a moving window).

In one embodiment, the time quality module 405 may maintain such a profile for multiple time sources. Given the FRC count vs. rising edge detection profile for a single time input, a change in slope may indicate either manipulation of the time signal or local time source degradation (e.g., oscillator degradation). For an embodiment where the time quality module 405 maintains such profiles for multiple time source inputs (for example, for GPS and for GLONASS), when a change in slope in one of the signals is detected, the time quality module 405 may compare the profiles of both signals. Then, if only one of the profiles shows the slope change, the time quality module 405 may determine that the time signal with the slope change is the manipulated time signal. Alternatively, if both of the profiles show the slope change (and further if the slope change occurs at the same FRC count), then the time quality module 405 may determine that some oscillator degradation has occurred.

Figure 10:
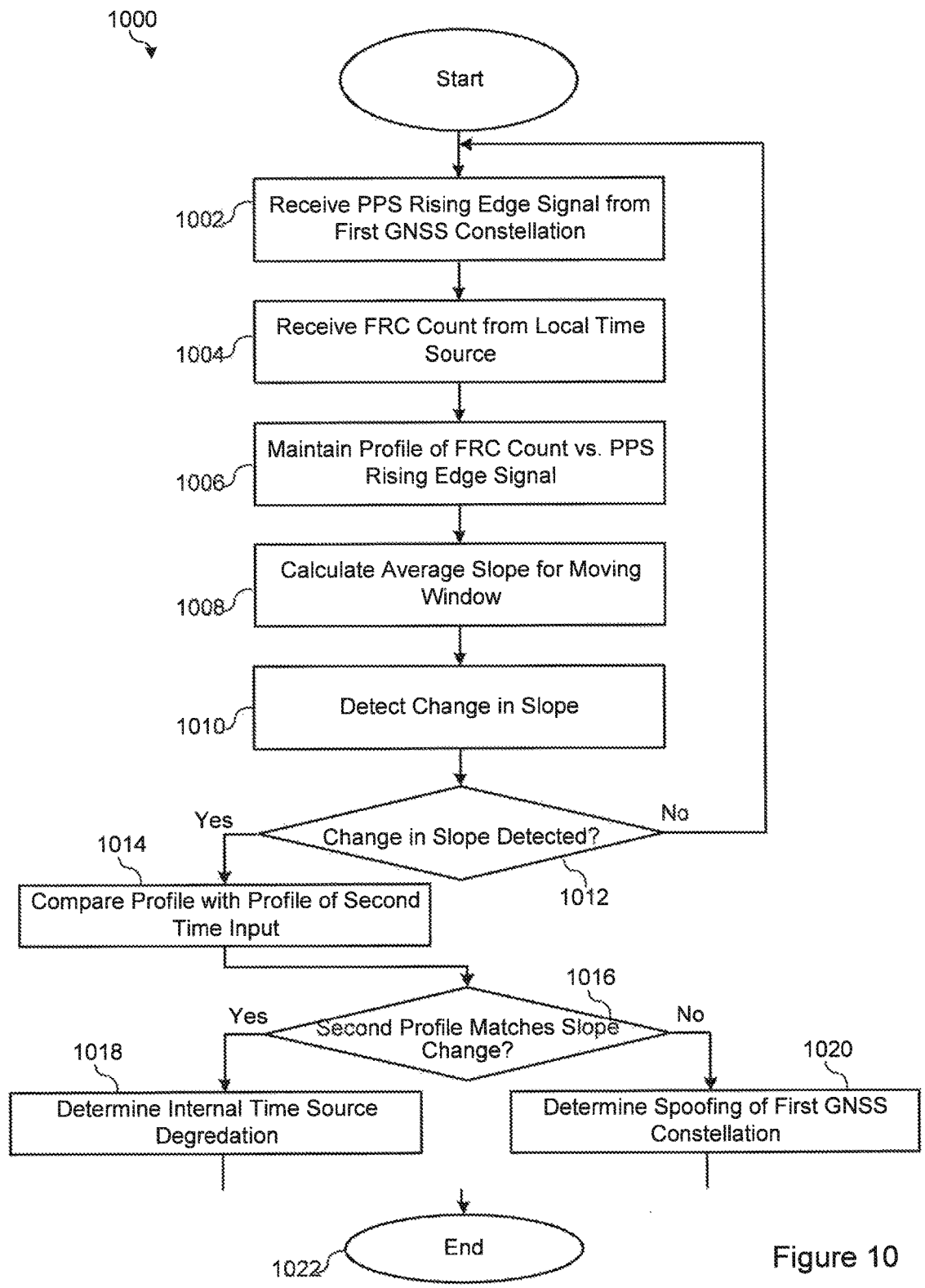
FIG. 10 illustrates a method for determining integrity of a time signal using an internal time reference.

FIG. 10 illustrates a method that may be used by a time distribution device for detecting manipulation of a time input signal by comparison against other time signals. The method 1000 may start with a time distribution device receiving a PPS rising edge signal from a first GNSS constellation 1002, as well as receiving an FRC count from a local time source 1004. The time distribution device may maintain a profile of FRC count vs. the PPS rising edge signal 1006 and calculate an average slope over a moving window 1008. Using the profile, the time distribution device may detect a change in slope 1010. If a change in slope is not detected 1012, the method returns to 1002. If the change in slope is detected 1012, the time distribution device may compare the profile with a profile of a second time input 1014. The second time input may include another GNSS constellation, a time signal according to IEEE 1588, or the like. If the second profile includes a slope change that matches the slope change of the first profile 1016, then the time distribution device determines that there is an internal time source degradation 1018 and ends 1022. If, however, the second profile does not include a slope change that matches the slope change of the first profile 1016, then the time distribution device determines that there has been a manipulation of the first GNSS constellation signal 1020. The time distribution device may then take remedial actions as described above, such as, for example, ceasing to use the manipulated GNSS constellation signal, sending an alarm, or the like. The method may return and continually monitor GNSS constellation signals for manipulation 1022.

While specific embodiments and applications of the disclosure have been illustrated and described, it is to be understood that the disclosure is not limited to the precise configuration and components disclosed herein. Various modifications, changes, and variations apparent to those of skill in the art may be made in the arrangement, operation, and details of the methods and systems of the disclosure without departing from the spirit and scope of the disclosure.

What is claimed is:

1. A time distribution device for receiving and distributing a time signal, comprising:
    a Global Navigation Satellite System (GNSS) receiver suitable for receiving a first time signal from a first GNSS constellation and a second time signal from a second GNSS constellation;
    a local time source suitable for providing a local time signal;
    a time quality module configured to:
        receive the first time signal and local time signal
        determine a first profile using the first time signal and the local time signal, wherein the first profile includes a rate of change of the local time signal within a time period based on the first time signal;
        determine a second profile using the second time signal and the local time signal, wherein the second profile includes a rate of change of the local time signal within a time period based on the first time signal; and
        in response to detecting a change in one or more of the first profile and the second profile, determine time signal manipulation; and
    a time output for distributing a time signal to a receiving device.

2. The time distribution device of claim 1, wherein the rate of change of the local signal within the time period based on the first time signal is represented by a slope.

3. The time distribution device of claim 1, wherein in response to detecting a change in the first profile or the second profile, the time quality module is configured to determine whether the first time signal or the second time signal has been manipulated or whether the local time signal has degraded.

4. The time distribution device of claim 1, wherein the local time source comprises a crystal oscillator.

5. The time distribution device of claim 1, wherein the local time signal comprises a free running counter.

6. A method for receiving and distributing a time signal, comprising:
    receiving, by a time distribution device, a first time signal from a first Global Navigation Satellite System (GNSS) constellation;
    receiving, by the time distribution device, a second time signal from a second GNSS constellation;
    distributing a time signal to a receiving device;
    determining a first profile using the first time signal and a local time signal from a time source local to the time distribution device, wherein the first profile includes a rate of change of the local time signal relative to the first time signal;
    determining a second profile using the second time signal and the local time signal, wherein the second profile includes a rate of change of the local time signal relative to the second time signal; and
    in response to detecting a change in the first profile or the second profile, transmitting a time signal manipulation.

7. The method of claim 6, wherein the rate of change of the local time signal relative to the first time signal comprises a slope.

8. The method of claim 6, wherein, in response to detecting a change in the first profile or the second profile, comparing the first profile with the second profile and determining whether one of the time signals has been manipulated or the local time source has degraded.

9. The method of claim 6, wherein the local time source comprises a crystal oscillator.

10. The method of claim 6, wherein the local time signal comprises a free running counter.

11. A time distribution device for receiving and distributing a time signal, comprising:

a Global Navigation Satellite System (GNSS) receiver suitable for receiving a first time signal from a first GNSS constellation and for receiving a second time signal from a second GNSS constellation;

a local time source suitable for providing a local time signal;

a time quality module configured to:
   receive the first time signal and local time signal
   determine a first profile using the first time signal and the local time signal, wherein the first profile includes a rate of change of the local time signal within a time period based on the first time signal;
   determine a second profile using the second time signal and the local time signal and monitor the second profile for changes;
   in response to detecting a change in the first profile, determine that the first time signal has been manipulated; and a time output for distributing a time signal based on the first time signal to a receiving device.

* * * * *